US 6,560,632 B1

(12) United States Patent
Chess et al.

(10) Patent No.: US 6,560,632 B1
(45) Date of Patent: May 6, 2003

(54) SYSTEM AND METHOD FOR MANAGING FILES IN A DISTRIBUTED SYSTEM USING PRIORITIZATION

(75) Inventors: David Michael Chess, Mohegan Lake, NY (US); Jeffrey Owen Kephart, Cortlandt Manor, NY (US); John Frederick Morar, Mahopac, NY (US); Edward John Pring, Putnam Valley, NY (US); Steve Richard White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,183

(22) Filed: Jul. 16, 1999

(51) Int. Cl.[7] .............................................. G06F 15/16
(52) U.S. Cl. ....................... 709/201; 709/202; 709/206; 709/207; 709/230; 711/129; 713/200; 713/201
(58) Field of Search ................................. 709/201, 235, 709/206, 207, 234, 236, 232, 233, 229, 103, 240; 713/200, 201; 711/129; 382/113; 707/2; 345/418

(56) References Cited

U.S. PATENT DOCUMENTS

| 4,984,279 | A | * | 1/1991 | Kidney et al. |
| 5,623,600 | A | * | 4/1997 | Ji et al. |
| 5,748,888 | A | * | 5/1998 | Angelo et al. |
| 5,903,735 | A | * | 5/1999 | Kidder et al. ................ 370/233 |
| 6,014,709 | A | * | 1/2000 | Gulick et al. |
| 6,018,515 | A | * | 1/2000 | Sorber |
| 6,088,767 | A | * | 7/2000 | Dan et al. |
| 6,167,392 | A | * | 12/2000 | Ostrovsky |
| 6,205,486 | B1 | * | 3/2001 | Wei et al. |
| 6,240,067 | B1 | * | 5/2001 | Sorber |
| 6,266,692 | B1 | * | 7/2001 | Greenstein |
| 6,304,262 | B1 | * | 10/2001 | Maloney et al. ............. 345/418 |
| 6,321,267 | B1 | * | 11/2001 | Donaldson |
| 6,324,570 | B1 | * | 11/2001 | Tonchev et al. ............. 709/207 |

* cited by examiner

Primary Examiner—Ayaz Sheikh
Assistant Examiner—Thu Ha Nguyen
(74) Attorney, Agent, or Firm—Gail H. Zarick; Harrington & Smith, LLP

(57) ABSTRACT

In a network-connected distributed system including nodes through which digital data flow, one or more of the nodes adapted to process the digital data, a method for efficiently managing the transmission of units of digital data from node to node includes the steps of receiving, at one of the one or more nodes, units of digital data first transmitted by an originating node; queuing, for processing at other nodes, one or more units of the digital data; prioritizing the queued units of digital data for transmission to a next node based on prioritizing information; and updating the prioritizing information according to results of processing performed in and received from the one of the one or more nodes and/or other nodes in the system.

33 Claims, 5 Drawing Sheets

SYSTEM AND METHOD FOR MANAGING FILES IN A DISTRIBUTED SYSTEM USING PRIORITIZATION

CROSS-REFERENCE TO RELATED APPLICATION

The teaching of U.S. application Ser. No. 09/356,770, filed on the same day herewith entitled, "SYSTEM AND METHOD FOR MANAGING FILES IN A DISTRIBUTED SYSTEM USING FILTERING" to Chess et al. is incorporated herein by reference.

FIELD OF THE INVENTION

The present invention relates to the management of files in a distributed system. More particularly, this invention relates to efficiently managing the transmission of files in a distributed system.

BACKGROUND OF THE INVENTION

In many distributed systems, units of digital data that require processing such as files, queries, or other requests for service (hereinafter "files") pass through a number of nodes during processing. These nodes are typically processes running on different machines (e.g., servers, workstations, desktop computers, laptops, pervasive systems, etc.) in the network. However, nodes can be logical processes, some of which run in the same machine. Each node may perform some, all or none of the processing required for a given file, and if further processing is required, it may pass the file along to another node. When a file is fully processed, typically the result is routed back toward the originator of the query, and/or some other recipient(s). Each node contains a certain amount of data that is used in processing files.

Congestion occurs in a distributed system when one or more nodes or communication links between nodes become too busy to handle the traffic destined for them. Either a node cannot process files as fast as they arrive, or a communication link cannot transmit files from one node to another fast enough to prevent queues from building up. When part of a system is congested, there will be files which are awaiting processing and/or transmission. Therefore, in a system in which there is a sequence or hierarchy of nodes through which a file is directed to flow, the earlier in the sequence of nodes a file can be fully processed and the results determined, the fewer nodes the file will have to pass through during processing, and the less severe congestion will be.

One particular distributed system in which congestion can be a severe problem is the computer virus "immune system" as described in Kephart et al., "Fighting Computer Viruses," Scientific American, November 1997, hereby incorporated by reference. In an "immune system," personal computers (PCs) are connected by a network to a central computer which analyzes viruses. Each PC incorporates a monitoring program which uses a variety of heuristics to infer that a virus may be present. The PCs, upon discovery of a suspect file, send a copy of the file to the central computer for analysis. After manual analysis by operators, the central computer eventually is instructed to transmit a prescription for verifying and removing the virus (assuming one is found). The prescription may be sent to one or more of the PCs as an update to be applied to databases maintained on those machines.

In a system in which a substantial number of PCs are connected to the network, suspect files may become queued up waiting for transmission to the central computer (or to a next higher level in a multi-level distributed system). For example, in distributed system 100 of FIG. 1, the units of digital data passed from node to node are files which are suspected of containing viruses, Trojan horses, worms or other types of malicious code. The nodes (which can be data processing systems such as disclosed in FIG. 1a of U.S. Pat. No. 5,440,723, (hereinafter '"723 patent") hereby incorporated by reference, or processes running therewithin) are organized in a hierarchy, such that suspect files found on one or more client machines 110 are first passed to one or more administrator machines 120, at which limited processing takes place, then passed to one or more gateway machines 130, and finally passed to a central analysis center 140, if necessary. Just as more than one gateway machine can be (and are preferably) utilized in this system, several analysis centers can be utilized for this function, if need be. Furthermore, the nodes can be logical so that a file determined to be suspect by a human user or by a process within a client computer 110 can be forwarded to another process (node) within the client computer 110. Indeed, there can be multiple logical nodes within any components of the distributed computer system 100, including the analysis center 140. In such systems, during the active spreading of a new fast-spreading virus, many suspect file copies containing the same virus code are likely to be submitted by the client machines 110 in a small period of time. This would cause serious congestion throughout the system 100.

Simple caching utilized in present systems will not be sufficient to prevent congestion, because any given client machine 110 or administrator machine 120 is unlikely to see a wide enough variety of files. That is, caching only the result of prior analysis of its own submitted files will not prevent enough congestion. Only by being apprised of the results of files submitted by others, and of general results (i.e. new virus definitions that apply to a given virus in any host file), will the analysis center be sufficiently shielded from redundant requests.

As indicated hereinabove, immune systems provide for updates to local databases which are utilized to eliminate the need to forward files or requests up the system hierarchy. However, these updates are initiated only after manual analysis or processing by a human operator at the analysis center. This is insufficient in an environment in which a substantial number of files or requests are generated in sometimes short periods of time. Furthermore, present systems have no method of managing the inevitable backlog of queued files or requests that must be forwarded up the hierarchy to another node.

Finally, current methods of speeding up components such as Web browsing are not designed to handle the sudden massive congestion that can be caused by a piece of replicating malicious code.

Therefore, there is a need for a system and method to efficiently manage the transmission of files or other units of digital data up the hierarchy from node to node so as to reduce the number of redundant files that are transmitted through the system.

Specifically, there is a need for a system and method for filtering or eliminating the necessity for further transmission of a file to another node by utilizing information which is updated by automatic processing at local or remote nodes.

Furthermore, there is a need for a system and method for prioritizing the files which are not filtered for transmission to other nodes, including identifying the order of transmission of these files and a need for a system and method for updating the data necessary to manage these decisions in a manual or automatic manner, as required.

SUMMARY OF THE INVENTION

The present invention is a system and method for increasing the efficiency of distributed systems and reducing congestion, by using the results of processing at a node to update the data used in processing at that and/or other nodes sometime in the future. Specifically, the present invention provides, in a network-connected distributed system including a plurality of nodes through which digital data flow, one or more of the nodes adapted to process the digital data, a method for efficiently managing the transmission of units of digital data from node to node, the method including the steps of receiving, at one of the one or more nodes, one or more units of digital data first transmitted by an originating node; queuing, for processing at other nodes, one or more units of the digital data; prioritizing the queued units of digital data for transmission to a next node based on prioritizing information; and updating the prioritizing information according to results of processing performed in and received from the one of the one or more nodes and/or other nodes in the system.

In one embodiment of the present invention, the distributed system includes nodes for the reporting and analysis of incorrect or buggy software, the units of digital data include files, and the transmitting step includes the step of returning updated information on bugs and fixes to the originating node and/or to other nodes.

In another embodiment of the present invention, the distributed system includes a system for the analysis of complex geographically-based data such as satellite images, the units of digital data include requests for information about a particular geographical area, and the transmitting step includes the step of returning updated information on areas which have already been analyzed in response to prior queries to the originating node and/or to other nodes.

In a further embodiment, the distributed system comprises a system for the computation of integrals, and the units of digital data comprise queries of formulae to be integrated.

The units of digital data preferably include queries or files. In one such embodiment, the distributed system includes a computer protection system and the units of digital data include files or checksums of files which are suspected to contain malicious code. The malicious code may include computer viruses, worms or Trojan Horses.

It is preferable that the prioritizing step comprises the steps of: classifying the queued queries or files into categories, clustering the files, in each of the categories, into similarity clusters; choosing, for each similarity cluster, one or more representatives; and determining an order of processing for the one or more representatives. The classifying step preferably includes the step of classifying the queued queries or files according to the type of digital object they contain.

The distributed system can comprise a computer protection system, the units of digital data can comprise files which are suspected to contain malicious code and the clustering step can include the step of clustering the files in each category according to a code-similarity measure evaluated on a probably-malicious part of each file. In this case, the clustering step preferably includes the step of using heuristics appropriate to each of the categories.

The choosing step can include the step of selecting N smallest files in each cluster as the one or more representatives, where N is an integer such as one. The determining step can include the step of ranking the one or more representatives so that representatives from clusters which contain more queued samples are to be transmitted prior to representatives from clusters which contain fewer queued samples.

The updating step preferably comprises the step of updating the prioritizing information according to results of automatic processing.

The updating step also may include the steps of determining a file to be probably malicious; identifying one or more other queued files as being in the same cluster as the file; and adjusting the prioritizing information in response to the identifying step.

In another embodiment of the present invention, the units of digital data include queries including a database version of the originating node and a request for an updated version, if available, and the updating step includes the step of updating the originating prioritizing information of the originating node and/or other nodes of the system that are likely to have older versions. Here, the database version preferably corresponds to the prioritizing information.

Another aspect of the invention includes a system for efficiently managing the transmission of units of digital data from node to node in a distributed network including a plurality of nodes, at least one of the nodes including a prioritizer adapted to prioritize units of the digital data queued for transmission to another node based on prioritizing information, the prioritizing information being updatable according to results of processing performed in and received from one of the plurality of nodes in the system.

Finally, another embodiment of the present invention includes, in a network-connected distributed system including a plurality of nodes through which digital data flow, one or more of the nodes adapted to process the digital data, a method for efficiently managing the transmission of units of digital data from node to node, the method including the steps of receiving, at one of the one or more nodes, units of digital data first transmitted by an originating node; filtering out sufficiently processed units of the digital data based on filtering information; transmitting, to the originating node and/or other nodes, filtered results relating to the sufficiently processed units; queuing, for processing at other nodes, unfiltered units of the digital data which are not filtered out; prioritizing the unfiltered units of digital data for transmission to a next node based on prioritizing information; and updating the filtering information and the prioritizing information according to results of automatic processing performed in and received from the one of the one or more nodes and/or other nodes in the system. The updating step optionally comprises the step of re-executing the filtering step and/or the prioritizing step to apply the updated filtering and prioritizing information to the queued units of the digital data. The units of digital data can comprise queries or files.

Also, a system for efficiently managing the transmission of units of digital data from node to node in a distributed network includes a plurality of nodes, at least one of the nodes including a filter adapted to filter out sufficiently processed units of the digital data based on filtering information, the filtering information being updatable according to results of automatic processing performed in and received from one of the plurality of nodes in the system; and a prioritizer adapted to prioritize units of the digital data queued for transmission to another node based on prioritizing information, the prioritizing information being updatable according to results of processing performed in and received from one of the plurality of nodes in the system.

BRIEF DESCRIPTION OF THE DRAWING

The present invention will be understood by reference to the drawing, wherein.

DETAILED DESCRIPTION OF THE PREFERRED EMBODIMENT

Figure 1:
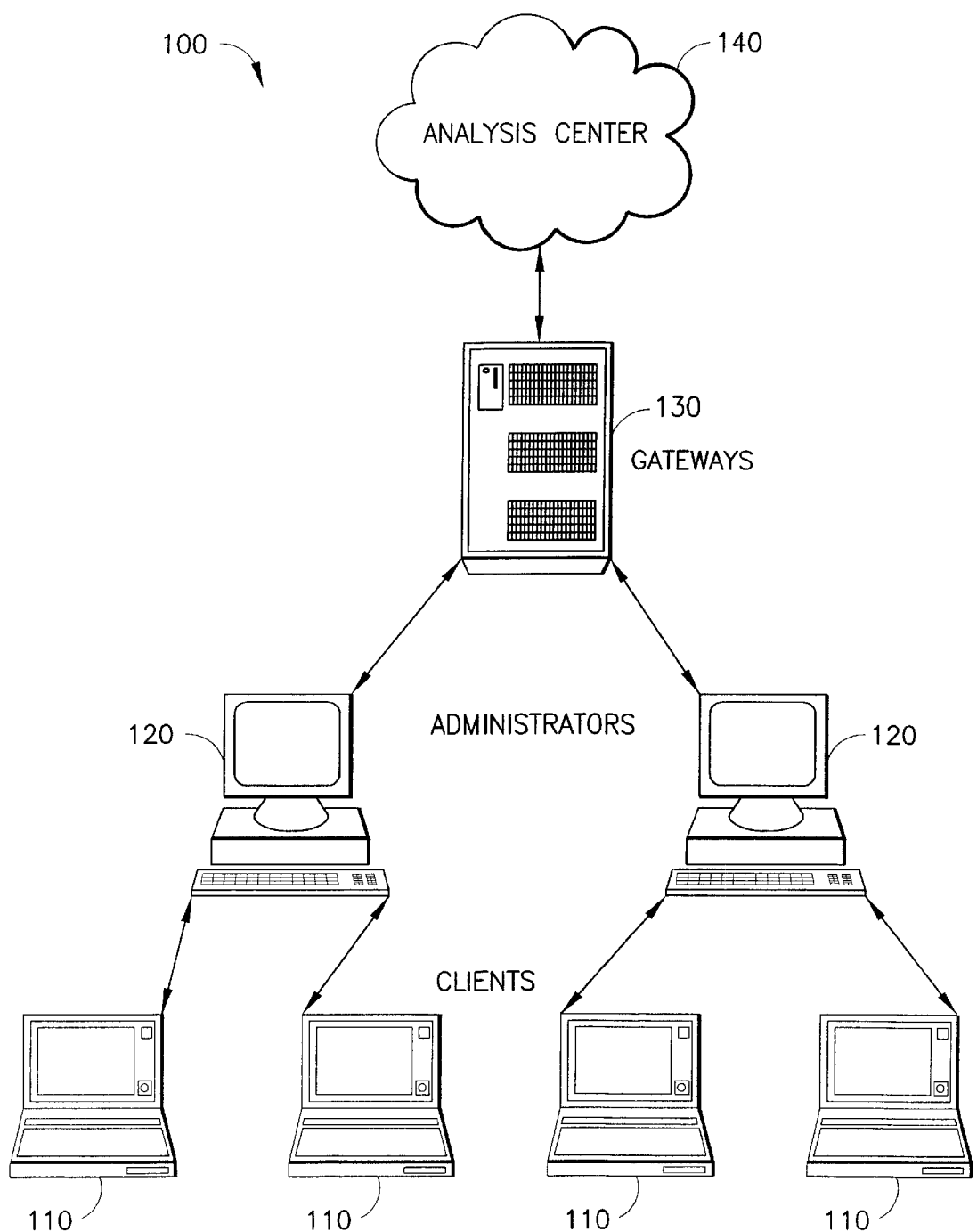
FIG. 1 is a schematic diagram of a distributed computer system within which the present invention can execute.
Figure 2:
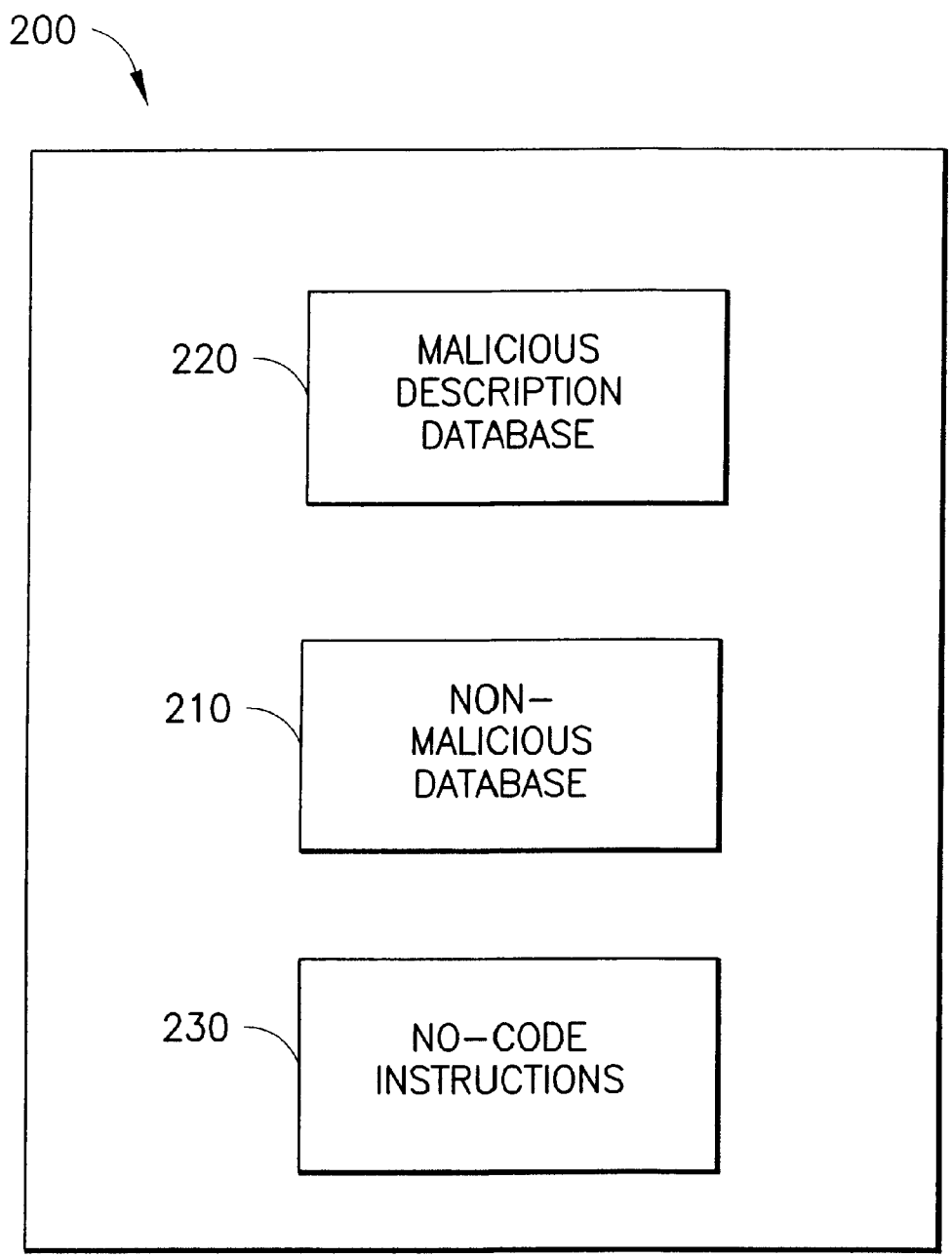
FIG. 2 is a block diagram of information stored on a node of the distributed computer system of FIG. 1 in accordance with an embodiment of the present invention.

In an immune system embodiment of the present invention, at each stage of the system 100 of FIG. 1, certain suspect files can be determined to be either non-malicious, or to contain a known piece of malicious code which can be detected (and eventually repaired) using a known description dataset. As shown in FIG. 2, each node 200, including the analysis center 140, contains or has access to a database 210 of modification detection codes (e.g., digital fingerprints or checksums) that uniquely identify files known to be non-malicious, a set of description datasets 220 (or protection definitions) describing how to detect and eliminate known malicious code entities (viruses, Trojan horses, worms, etc.), and instructions 230 for recognizing files that cannot contain malicious code because they contain no code at all (visual images, audio recordings, etc.) or so little code that no plausible virus would fit therein.

Figure 3:
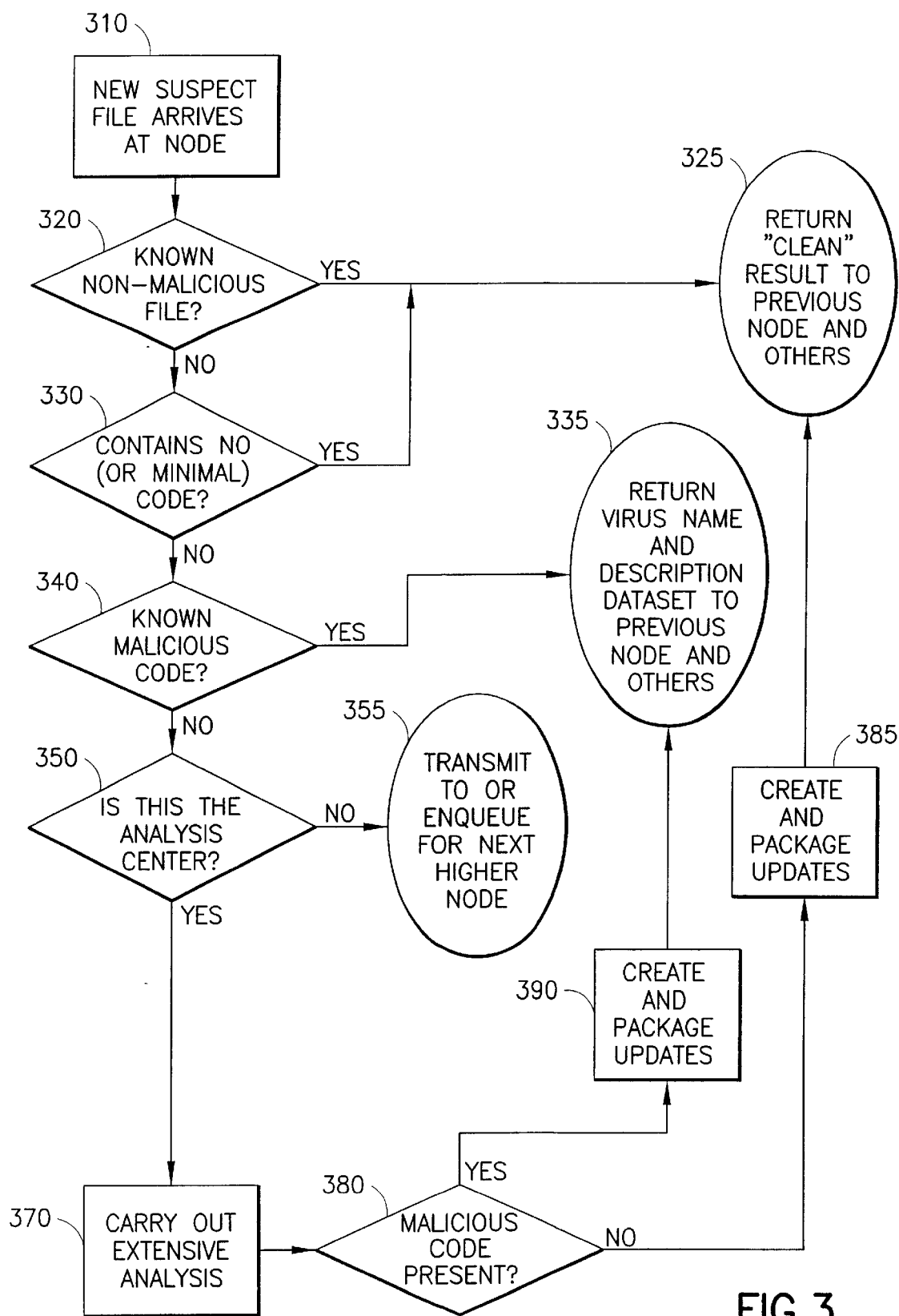
FIG. 3 is a flow diagram of a method of an embodiment of the present invention.

As shown in FIG. 3, several steps are taken in accordance with an embodiment of the present invention when a file arrives at a node in step 310. First, in step 320, the file is checked against the database 210 of known non-malicious files. If the file is identified as a known non-malicious file, a "clean" result is returned, in step 325, to the previous node from where it was last transmitted, as well as to other subsidiary nodes, including the original node which suspected a problem. If, in step 320, no match is found, the process continues in step 330. In step 330, the file is checked against the instructions 230 for recognizing files that contain no code. If a match is found in step 330, the process continues in step 325 as indicated hereinabove. If no match is found, the process continues in step 340. In step 340, the file is compared to the database 220 of malicious-code descriptions. If the file is identified as including known malicious code, then, in step 335, the results are returned to the previous node (as well as to other subsidiary nodes, including the original node which suspected a problem), indicating that the file is malicious, what particular malicious code entity (e.g., virus name) it contains, as well as the description dataset 220 that can be used to detect and eliminate the malicious code (and repair other infected files, if any). If a match is not found, it is determined, in step 350, whether the present node is located within or associated with an analysis center 140. If the node is not located within or associated with an analysis center 140, the file is queued for transmission to a node in the next (higher) level of the hierarchy, in step 355 and the process continues in FIG. 4.

Optionally, the system can be designed such that when a file is to be transmitted to another node up the hierarchy, a checksum of the file is actually sent in advance of the actual file. The receiving node can therefore search its databases for the file's checksum to determine whether the file has been previously analyzed. If a match is found, the results from the previous analysis are returned to the originating nodes and/or other nodes on the system. This embodiment would eliminate the need to transmit the file's content in many cases, thus avoiding unnecessary work.

However, if a file reaches a node of an analysis center 140, the file is subjected, in step 370, to rigorous analysis, including (depending on the type of file it is) some combination of execution in a simulated environment, execution on specially-instrumented machines or machine emulators which are prepared with "goat" or decoy files (e.g., files of the same basic type as the suspect file as determined by classification discussed hereinbelow which can be infected by any virus within the suspect file when executed), static analysis, processes disclosed in the '723 patent and other measures known to those skilled in the art. This analysis can, but need not, involve help from human analysts, if necessary. When the analysis process is completed, the file is determined, in step 380, to be either non-malicious (with some high probability), or to contain a new and now-known malicious-code entity. If malicious code is not found, the process continues in step 385, in which an update to known non-malicious database 210 is created. The update is first applied to the analysis center's database and then it is packaged for transmission down the hierarchy of nodes. The method continues in step 325 as indicated hereinabove. If malicious code is determined to be present, the process continues in step 390, in which an update to the known malicious description database 200 is created. This update is also applied to the analysis center's database, then packaged for transmission down the hierarchy of nodes. The method continues in step 335 as indicated hereinabove.

There are several ways in which the updates can be distributed downstream in the distributed system. Preferably, after updating its own database, the analysis center sends the update to the problem-originating node (and associated machine) and to all other nodes in the path(s) therebetween. Optionally, the update can be transmitted to other nodes under the analysis center's "umbrella." For instance, the update can be sent to the high-level gateway machines 130, so that the next time another copy of this file (in the case of non-malicious files) or any file containing this particular malicious code (in the case of malicious code) is received at the gateway, it may be dealt with without requiring the resources of the analysis center. The gateways in turn may distribute this update to administrator systems 120 (e.g., in companies which have paid for instant updates) and the administrative systems may distribute the update to the client machines that they serve.

Figure 4:
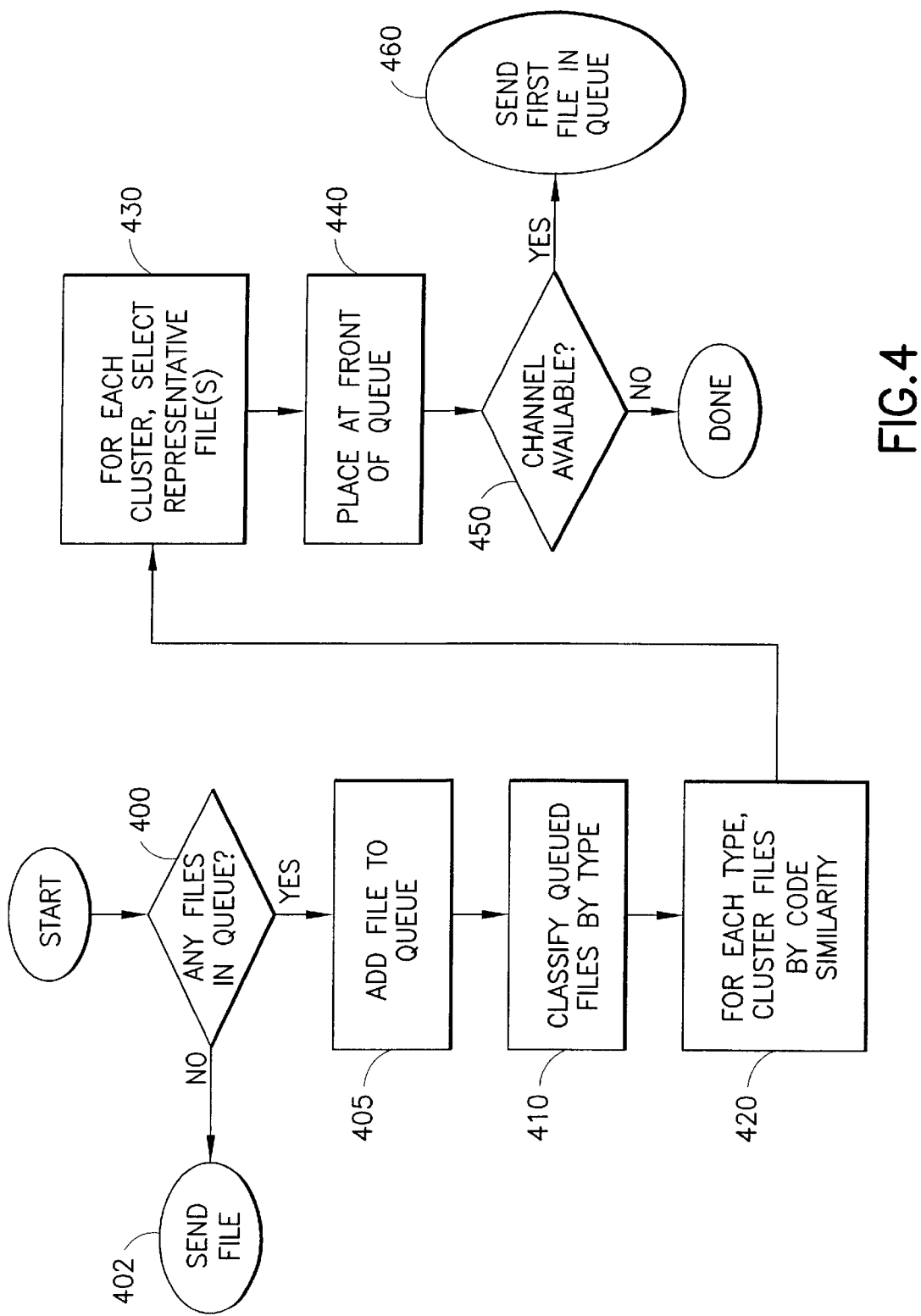
FIG. 4 is a flow diagram of another method of an embodiment of the present invention.

In one embodiment of the present invention, shown in FIG. 4, a file destined to be queued for transmission in step 355 is processed. First, in step 400, it is determined whether there are any files presently in the queue. If no files are present, the file is transmitted to the next higher node in the hierarchy, in step 402. If other files exist in the queue, the file is added to the queue in step 405. Next, in step 410, the queued files are classified according to their basic type or by the type of digital object they contain. Possible classifications include but are not limited to 16-bit binary executable, 32-bit binary executable, boot record image, word-processing document, spreadsheet, etc. Within each classification (or type), the files are clustered, in step 420, by using a code-similarity metric to determine the similarity of the possibly-malicious code in each file to the corresponding code in the other files, and grouping together those files which are closest according to the metric. One effective code similarity metric works as follows. For each file, the probably-malicious portion of the file is identified by appropriate heuristics. For instance, if a file was identified as probably containing malicious code via a generic-disinfection algorithm like that taught in U.S. Pat. No. 5,613,002, hereby incorporated by reference, then the auxiliary information accompanying the file indicates where the probably-malicious code resides within the file. Several heuristics for detecting probably-malicious code other than generic disinfection are known by those skilled in the art, some of them tailored to binary executables, and others to either boot record images, word-processing documents, spread sheets, or other types of hosts that can carry malicious code. Most of these heuristics are capable of determining exactly or approximately the location of the probably-malicious code, and this information can similarly be incorporated into auxiliary information accompanying the file. If such auxiliary information is not supplied with the file, the appropriate heuristic or heuristics could potentially be run at the node to supply that information.

For each sample, tally all n-grams of a given size N (say N=5) that occur within the probably-malicious regions. Next apply some squashing function F to the tallies, e.g., F(t)= max(t,2). Then each file is represented by a resulting (squashed) tally vector. The vectors may then be adjusted to take into account the expected N-gram frequencies within normal non-malicious code, and to give greater weight to unusually common or uncommon N-grams. Next, the similarity is computed as a normalized dot product for each pair of vectors. Regard a pair of files as "associated" if the dot product exceeds a given threshold, and then divide the files into clusters by performing the transitive closure of the association relation. The threshold may be fixed at some particular value, or the algorithm may be applied with multiple thresholds, until one is found that yields a desired number of clusters.

Once the files have been grouped according to how likely they are to contain the same malicious code, one or more representative files are chosen from each cluster, in step 430. A variety of possible methods exist for choosing a representative file. One simple, but effective, heuristic which also saves network bandwidth consists of simply choosing the smallest file from each group. Other possibilities include sending that file which seems likely to be easiest to analyze (which will often be the smallest, but not always), choosing a file which seems to be the result of malicious-code infection of one of a set of known non-malicious files, or choosing that file which compresses the best. In step 440, those representative files are queued to be transmitted prior to the other members of each cluster. In a preferred embodiment, the representative files themselves are prioritized according to the expected cost-effectiveness of analyzing each one. For instance, the representative of the largest cluster might be sent first, since that cluster is likely to represent the most widespread malicious code entity. The process continues in step 450 in which the availability of one or more channels (to other nodes) is determined. If not available, the channel is checked once again after a period of time. If the channel is available (or becomes available), the first file in the queue is transmitted to the next higher node in the hierarchy, in step 460.

Figure 5:
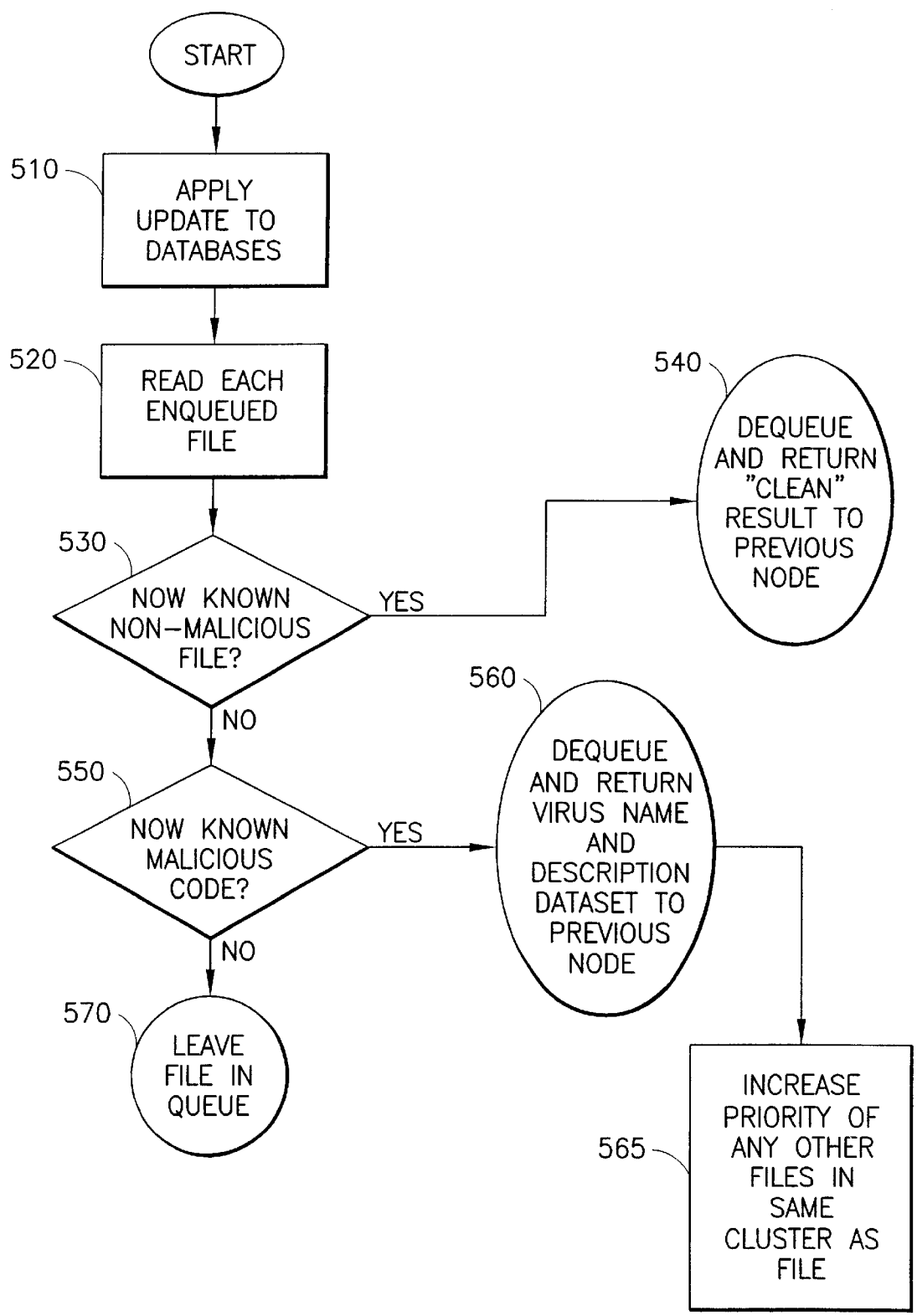
FIG. 5 is a flow diagram of yet another method of an embodiment of the present invention.

FIG. 5 shows the process of an embodiment of the present invention after a database update is received at a node. When a node receives a database update, as in steps 390 and 335, it updates, in step 510, the relevant databases so that files received in the future will be checked for matches against the new (as well as preexisting, but still valid) knowledge. The node also checks all files that are queued for transmission to the next node, in step 520. If any matches are found, those files are dequeued, and processed as follows. In step 530, each queued file is compared to the non-malicious file database. If a match is found, the file is dequeued and the clean result is returned to the previous node in step 540. If no match is found, the queued file is checked against the dataset for malicious code in step 550. If a match is found, the file is dequeued and the virus name and description dataset is returned to the previous node in step 560. Additionally, if any other files still in the queue are in the same cluster as a file for which a match is found on the updated malicious-code database, those files are moved up in transmission priority in step 565, since they contain code which is similar to known malicious code, and are therefore more likely to be malicious themselves. If no match is found, the queued file is left in the queue in step 570.

This is important, because in the case of a sudden "outbreak" of a replicating malicious-code entity such as a network worm, a very large number of copies of the malicious code may be found on client machines and sent into the distributed system. Since the processing done by an analysis center 140 is resource-intensive, it would bog down the entire system if every one of those copies were to be processed by the analysis center 140. When the present invention is used, only one copy of the new entity is processed by an analysis center 140, and as the database updates travel downward through the network, the many copies of the entity that are queued for transmission upward will be dequeued and processed lower down, thereby increasing the efficiency of the system. Once the updates have traveled all the way to the client machines 110, clients encountering the new entity will be able to deal with it themselves, without involving any other nodes of the system.

In an alternate embodiment of the present invention, the unit of digital data is a type of query that does not include a suspected malicious file, but only serves to facilitate the distribution of database updates in, e.g., an anti-virus system. In this embodiment, a node may send, to another node up the hierarchy, a query which states the current version of one or more databases that the node possesses, and requests that any updates that have occurred since that version be transmitted to it. Such queries can be handled by the first node that receives the query and has a more recent version. Optionally, such queries can be transmitted to the analysis center at every instance. When a node satisfies such a query, it can send the newer updates not only to the node that originated the query, but also to any other nodes in the hierarchy that are known, either certainly or heuristically, to be lacking those updates.

A further embodiment of the present invention relates to a distributed electronic mail ("e-mail") system. In this embodiment, the distributed system comprises a system for filtering out undesirable mail from client's inboxes. The units of digital data are samples of undesirable textual messages (e.g., spam, hoaxes, etc.). Updating the databases of intermediate nodes would create a more efficient system for preventing the proliferation of such undesirable messages.

Another embodiment of the present invention relates to a distributed system for facilitating sophisticated analysis of satellite data. In this embodiment, the distributed system comprises a system for the analysis of complex geographically-based data such as satellite images. The units of digital data are preferably requests (queries) for information about a particular geographical area. The updating of the databases serves to increase the efficiency with which the system processes the queries about areas which already have been analyzed in response to prior queries.

Another embodiment of the present invention relates to the computation of expensive integrals. In this embodiment, the distributed system is a system for the computation of integrals. The units of digital data are queries of formulae to be integrated.

Now that the invention has been described by way of a preferred embodiment, various modifications and improvements will occur to those of skill in the art. For instance, any distributed system in which there exists relatively expensive back-end processing (e.g., server processing) and intermediary nodes capable of filtering or prioritizing and where, once the back-end has processed a particular request from a client, it is likely that one or more other clients will make the same request at some point, can benefit from the present invention by updating the other intermediary nodes in the network with the result of the processing. Thus, it should be understood that the preferred embodiment is provided as an example and not as a limitation. The scope of the invention is defined by the appended claims.

We claim:

1. In a network-connected distributed system comprising a plurality of nodes through which digital data flow, one or more of the nodes adapted to process the digital data, a method for efficiently managing the transmission of units of digital data from node to node, the method comprising the steps of:
   receiving, at one of the one or more nodes, one or more units of digital data first transmitted by an originating node;
   queuing, for processing at other nodes, one or more units of the digital data;
   prioritizing the queued units of digital data for transmission to a next node based on prioritizing information; and
   updating the prioritizing information according to results of processing performed in and received from at least one of the one of the one or more nodes and other nodes in the system,
   where the units of digital data comprise queries or files, and wherein the prioritizing step comprises the steps of:
   classifying the queued queries or files into categories,
   clustering the files, in each of the categories, into similarity clusters;
   choosing, for each similarity cluster, one or more representatives; and
   determining an order of processing for the one or more representatives.

2. The method of claim 1 wherein the distributed system includes nodes for the reporting and analysis of incorrect or buggy software and the units of digital data comprise files.

3. The method of claim 1 wherein the distributed system comprises a system for the analysis of complex geographically-based such as satellite images and the units of digital data comprise requests for information about a particular geographical area.

4. The method of claim 1 wherein the distributed system comprises a system for the computation of integrals, and the units of digital data comprise queries of formulae to be integrated.

5. The method of claim 1 wherein the distributed system comprises a computer protection system and the units of digital data comprise files or checksums of files which are suspected to contain malicious code.

6. The method of claim 5 wherein the malicious code comprises at least one of computer viruses, worms or Trojan Horses.

7. The method of claim 1 wherein the classifying step includes the step of classifying the queued queries or files according to the type of digital object they contain.

8. The method of claim 1 wherein the distributed system comprises a computer protection system, the units of digital data comprise files which are suspected to contain malicious code and the clustering step includes the step of clustering the files in each category according to a code-similarity measure evaluated on a probably-malicious part of each file.

9. The method of claim 8 wherein the clustering step includes the step of using heuristics appropriate to each of the categories.

10. The method of claim 8 wherein the updating step comprises the steps of:
    determining a file to be probably malicious;
    identifying one or more other queued files as being in the same cluster as the file; and
    adjusting the prioritizing information in response to the identifying step.

11. The method of claim 1 wherein the choosing step comprises the step of selecting N smallest files in each cluster as the one or more representatives, where N is an integer such as one.

12. The method of claim 1 wherein the determining step includes the step of ranking the one or more representatives so that representatives from clusters which contain more queued samples are to be transmitted prior to representatives from clusters which contain fewer queued samples.

13. The method of claim 1 wherein the updating step comprises the step of updating the prioritizing information according to results of automatic processing.

14. The method of claim 1 wherein the distributed system comprises a computer protection system and the units of digital data comprise samples of undesirable textual messages.

15. In a network-connected distributed system comprising a plurality of nodes through which digital data flow, one or more of the nodes adapted to process the digital data, a method for efficiently managing the transmission of units of digital data from node to node, the method comprising the steps of:
    receiving, at one of the one or more nodes, one or more units of digital data first transmitted by an originating node;
    queuing, for processing at other nodes, one or more units of the digital data;
    prioritizing the queued units of digital data for transmission to a next node based on prioritizing information; and
    updating the prioritizing information according to results of processing performed in and received from at least one of the one of the one or more nodes and other nodes in the system,
    where the units of digital data comprise queries or files, and
    wherein the units of digital data comprise queries including a database version of the originating node and a request for an updated version, if available, and wherein the updating step comprises the step of updating the originating prioritizing information of the originating node and/or other nodes of the system that are likely to have older versions.

16. The method of claim 15 wherein the database version corresponds to the prioritizing information.

17. In a network-connected distributed system comprising a plurality of nodes through which digital data flow, one or more of the nodes adapted to process the digital data, a method for efficiently managing the transmission of units of digital data from node to node, the method comprising the steps of:

receiving, at one of the one or more nodes, units of digital data first transmitted by an originating node;

filtering out sufficiently processed units of the digital data based on filtering information;

transmitting, to at least one of the originating node and other nodes, filtered results relating to the sufficiently processed units;

queuing, for processing at other nodes, unfiltered units of the digital data which are not filtered out;

prioritizing the unfiltered units of digital data for transmission to a next node based on prioritizing information; and updating the filtering information and the prioritizing information according to results of automatic processing performed in and received from at least one of the one of the one or more nodes and other nodes in the system;

wherein the updating step comprises the step of re-executing at least one of the filtering step and the prioritizing step to apply the updated filtering and prioritizing information to the queued units of the digital data.

18. The method of claim 17 wherein the distributed system comprises a computer protection system, the units of digital data comprise samples of undesirable textual messages and the transmitting step includes the step of returning updated protection information to at least one of the originating node and other nodes.

19. The method of claim 17 wherein the distributed system includes nodes for the reporting and analysis of incorrect or buggy software, the units of digital data comprise files, and the transmitting step includes the step of returning updated information on bugs and fixes to at least one of the originating node and other nodes.

20. The method of claim 17 wherein the distributed system comprises a system for the analysis of complex geographically-based data such as satellite images, the units of digital data comprise requests for information about a particular geographical area, and the transmitting step includes the step of returning updated information on areas which have already been analyzed in response to prior queries to at least one of the originating node and other nodes.

21. The method of claim 17 wherein the distributed system comprises a system for the computation of integrals, and the units of digital data comprise queries of formulae to be integrated.

22. The method of claim 17 wherein the distributed system comprises a computer protection system and the units of digital data comprise files or checksums of files which are suspected to contain malicious code.

23. The method of claim 22 wherein the malicious code comprises at least one of computer viruses, worms or Trojan Horses.

24. A system for efficiently managing the transmission of units of digital data from node to node in a network-connected distributed system comprising a plurality of nodes through which digital data flow, one or more of the nodes adapted to process the digital data, the system comprising:

means for receiving, at one of the one or more nodes, one or more units of digital data first transmitted by an originating node;

means for queuing, for processing at other nodes, one or more units of the digital data;

means for prioritizing the queued units of digital data for transmission to a next node based on prioritizing information; and means for updating the prioritizing information according to results of processing performed in and received from at least one of the one of the one or more nodes and other nodes in the system, where the units of digital data comprise queries or files; and wherein the prioritizing means comprise:

means for classifying the queued queries or files into categories, means for clustering the files, in each of the categories, into similarity clusters;

means for choosing, for each similarity cluster, one or more representatives; and means for determining an order of processing for the one or more representatives.

25. The system of claim 24 wherein the classifying means include means for classifying the queued queries or files according to the type of digital object they contain.

26. The system of claim 24 wherein the distributed system comprises a computer protection system, the units of digital data comprise files which are suspected to contain malicious code and the clustering means include means for clustering the files in each category according to a code-similarity measure evaluated on a probably-malicious part of each file.

27. The system of claim 26 wherein the clustering means include means for using heuristics appropriate to each of the categories.

28. The system of claim 26 wherein the updating means comprise:

means for determining a file to be probably malicious;

means for identifying one or more other queued files as being in the same cluster as the file; and means for adjusting the prioritizing information in response to the identifying means.

29. The system of claim 24 wherein the choosing means comprise means for selecting N smallest files in each cluster as the one or more representatives, where N is an integer such as one.

30. The system of claim 24 wherein the determining means include means for ranking the one or more representatives so that representatives from clusters which contain more queued samples are to be transmitted prior to representatives from clusters which contain fewer queued samples.

31. A system for efficiently managing the transmission of units of digital data from node to node in a network-connected distributed system comprising a plurality of nodes through which digital data flow, one or more of the nodes adapted to process the digital data, the system comprising:

means for receiving, at one of the one or more nodes, one or more units of digital data first transmitted by an originating node;

means for queuing, for processing at other nodes, one or more units of the digital data;

means for prioritizing the queued units of digital data for transmission to a next node based on prioritizing information; and means for updating the prioritizing information according to results of processing performed in and received from at least one of the one of the one or more nodes and other nodes in the system, where the units of digital data comprise queries or files; and wherein the units of digital data comprise queries including a database version of the originating node and a request for an updated version, if available, and wherein the updating means comprise means for updating the originating prioritizing information of at least one of the originating node and other nodes of the system that are likely to have older versions.

32. The system of claim 31 wherein the database version corresponds to the prioritizing information.

33. A system for efficiently managing the transmission of units of digital data from node to node in a network-connected distributed system comprising a plurality of nodes through which digital data flow, one or more of the nodes adapted to process the digital data, the system comprising:

means for receiving, at one of the one or more nodes, units of digital data first transmitted by an originating node;

means for filtering out sufficiently processed units of the digital data based on filtering information;

means for transmitting, to at least one of the originating node and other nodes, filtered results relating to the sufficiently processed units;

means for queuing, for processing at other nodes, unfiltered units of the digital data which are not filtered out;

means for prioritizing the unfiltered units of digital data for transmission to a next node based on prioritizing information; and means for updating the filtering information and the prioritizing information according to results of automatic processing performed in and received from at least one of the one of the one or more nodes and other nodes in the system;

wherein the updating means comprise at least one of means for re-filtering and means for re-prioritizing to apply the updated filtering and prioritizing information to the queued units of the digital data.

* * * * *

UNITED STATES PATENT AND TRADEMARK OFFICE
CERTIFICATE OF CORRECTION

PATENT NO. : 6,560,632 B1  Page 1 of 1
DATED : May 6, 2003
INVENTOR(S) : David M. Chess et al.

It is certified that error appears in the above-identified patent and that said Letters Patent is hereby corrected as shown below:

Column 9,
Line 57, insert -- data -- between "geographically-based" and "such"

Signed and Sealed this

Twenty-third Day of March, 2004

JON W. DUDAS
*Acting Director of the United States Patent and Trademark Office*